(12) United States Patent
Pasbrig et al.

(10) Patent No.: US 6,357,627 B1
(45) Date of Patent: Mar. 19, 2002

(54) DOSING DEVICE FOR A CONTAINER

(75) Inventors: Mathias Pasbrig, Rheine; Gisela Fockenbrock, Münster, both of (DE); Oliver Langlois, Vernouillet; Gerard Fani, Etuz, both of (FR); Johannes Hins, Sundern-Hagen (DE)

(73) Assignee: Compo GmbH & Co. KG, Muenster (DE)

( * ) Notice: Subject to any disclaimer, the term of this patent is extended or adjusted under 35 U.S.C. 154(b) by 0 days.

(21) Appl. No.: 09/622,481

(22) PCT Filed: Dec. 23, 1998

(86) PCT No.: PCT/EP98/08461

§ 371 Date: Aug. 17, 2000

§ 102(e) Date: Aug. 17, 2000

(87) PCT Pub. No.: WO99/44019

PCT Pub. Date: Sep. 2, 1999

(30) Foreign Application Priority Data

Feb. 27, 1998 (EP) .............................................. 98103404
Jun. 12, 1998 (DE) ......................................... 198 26 278

(51) Int. Cl.[7] ................................................. B67D 5/00
(52) U.S. Cl. ......................... 222/81; 222/83; 222/425; 222/453; 222/444; 222/445
(58) Field of Search ............................ 222/83, 81, 441, 222/444, 445, 446, 447, 450, 453, 425, 153.01

(56) References Cited

U.S. PATENT DOCUMENTS

| | | | | |
|---|---|---|---|---|
| 2,148,335 A | * | 2/1939 | Arola | 221/147 |
| 3,378,168 A | * | 4/1968 | Hildebrandt | 222/83 |
| 5,078,305 A | * | 1/1992 | Glynn et al. | 222/442 |
| 5,407,104 A | * | 4/1995 | Santagiuliana | 222/425 |
| 6,068,165 A | * | 5/2000 | Minihane et al. | 222/454 |

FOREIGN PATENT DOCUMENTS

DE 3510859 A1 * 10/1986 ........... B65D/47/38

* cited by examiner

*Primary Examiner*—Kevin Shaver
*Assistant Examiner*—Frederick C Nicolas
(74) *Attorney, Agent, or Firm*—Keil & Weinkauf

(57) ABSTRACT

A metering device (2) for a storage container (1), the storage container (1) having an attachment piece (21) on which the metering device (2) is secured, the metering device (2) having a closure piece (4) which can be activated by means of a closure lid (3) and which is in operational engagement with the closure lid (3) in such a manner that when the closure lid (3) is opened, the closure piece (4) closes the outlet opening of the storage container (1), whereas when the closure lid (3) is shut, the closure piece (4) frees the outlet opening of the storage container (1), the metering device (2) having, prior to its first use, an integrally connected sealing element in the area of the outlet opening of the storage container (1), and the closure piece (4) having means (24) for establishing a liquid-perneable connection between the storage container (1) and the metering device (2).

4 Claims, 3 Drawing Sheets

Figure 1:
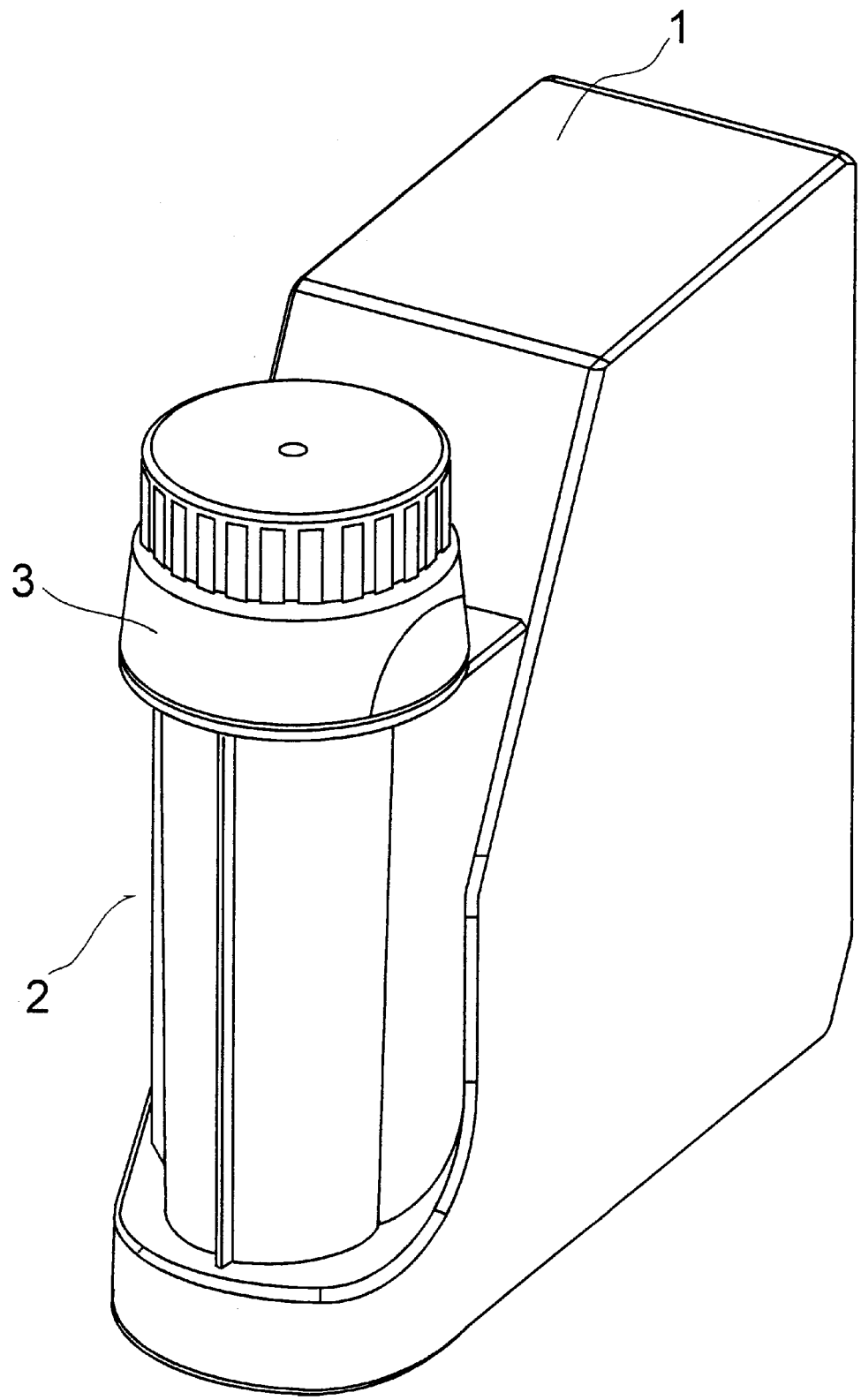

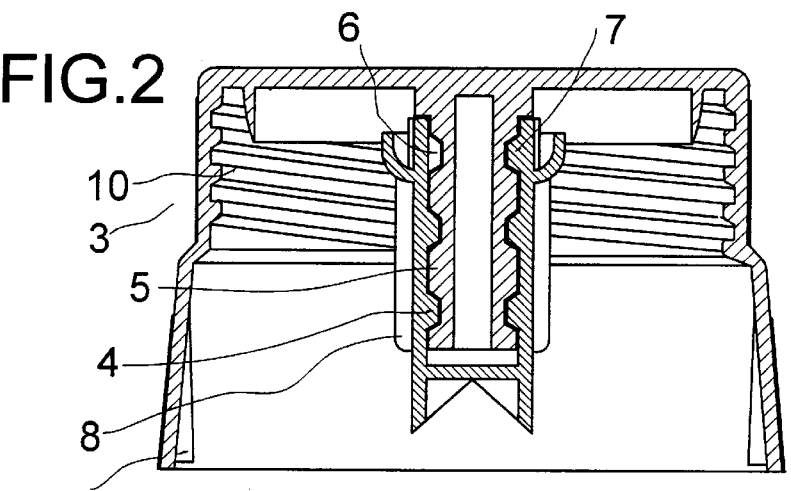
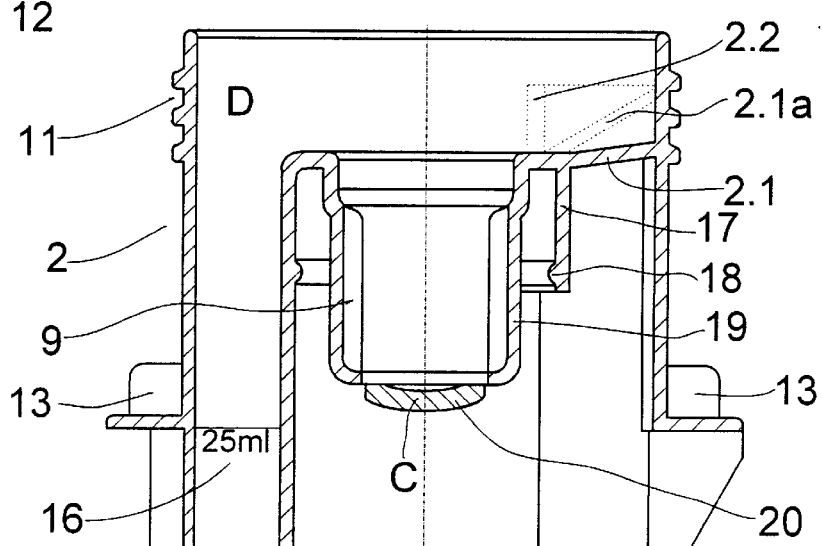
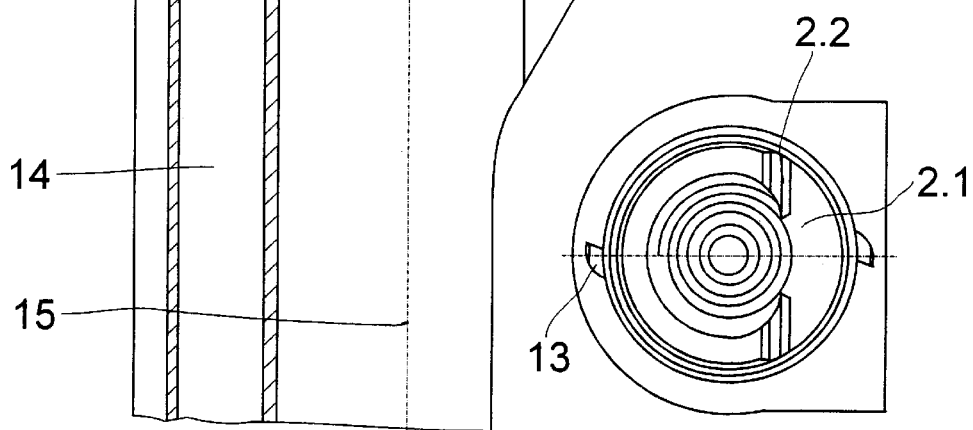

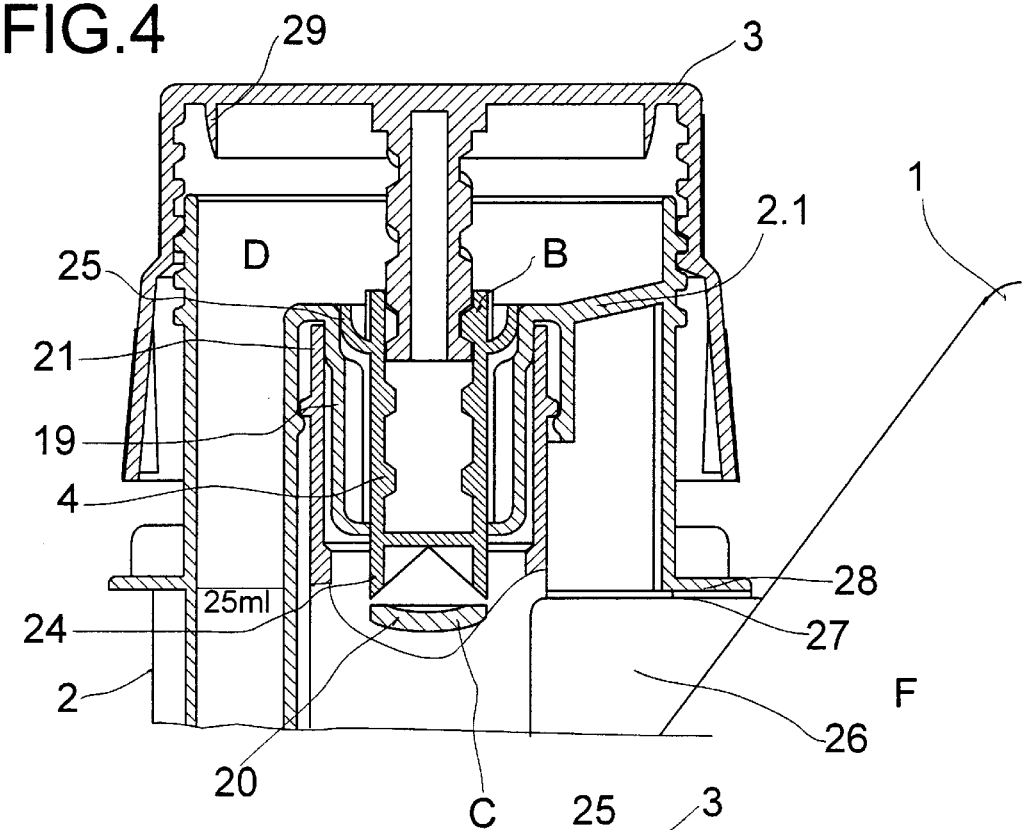
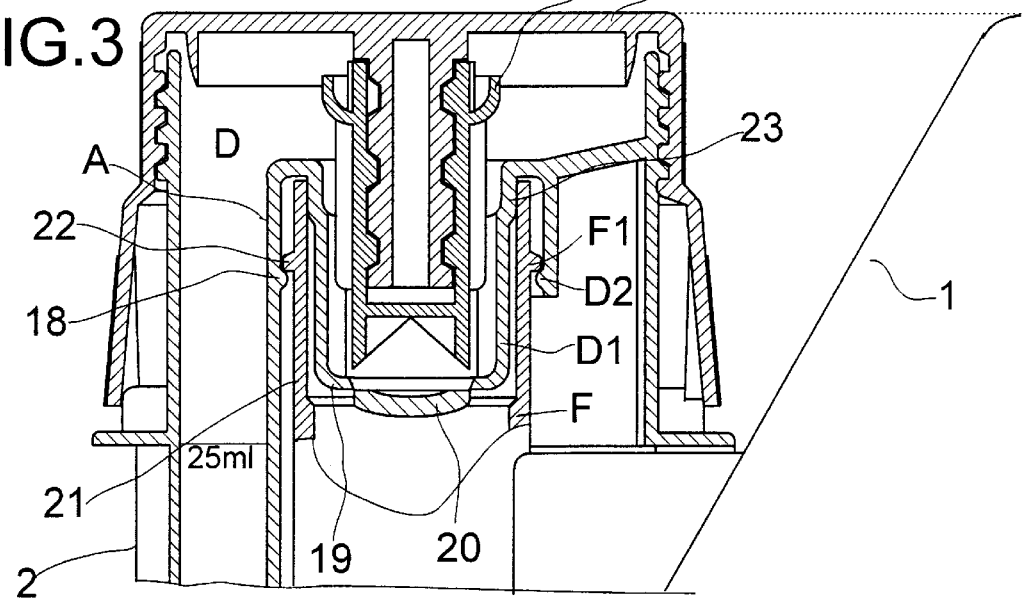

DOSING DEVICE FOR A CONTAINER

A metering device for a container is used for metering liquid products which pass from a container into the metering device before being emptied out in a desired amount.

Metering bottles with a riser tube are known, where the bottle consists of two chambers, namely a storage container and a metering device. By pressing the storage container, the liquid product is led through a riser tube into the metering device. The metering device itself is provided with a measurement scale in order to meter different amounts. If the metering device is filled beyond the maximum metering amount, the excess amount flows through the riser tube back into the storage container. The disadvantage here is that the metering can only take place with the metering device opened.

If the intention is to meter less than the maximum metering amount, only slight pressure may be exerted on the bottle to ensure that the desired metering amount is not exceeded. If too much pressure is exerted on the bottle, there is no possibility of returning the excess metered amount back into the storage container. Therefore, only one metering amount can be accurately drawn off. U.S. Pat. No. 4,079,859 also discloses a bottle which once again consists of two chambers, namely the storage container and the metering device. By tilting the bottle through 90°, the product flows from the storage container into the metering device. In order to read off the level in the metering device, the bottle is then brought back to an upright position. The exact metering is achieved by tilting and righting the bottle a number of times, as a result of which different amounts can be metered.

Although the user in this case is protected from contact with the product while metering said product, the metering container can nevertheless fill with the product during the drawing off process or during transportation. Depending on the consistency and color of the product, this can reduce the acceptance of the product.

An important disadvantage is that exact metering is no longer possible if the degree of inclination of the bottle when pouring out the metered amount into another container is about 90°, since in this case product also flows out of the storage container.

In DE-U-297 04 099, this disadvantage is avoided by means of a metering device which is secured on the container and is provided with a closure element that can be activated via the lid part. The connection is such that when the lid part is removed, the closure element closes the passage leading into a metering chamber, and when the lid part is screwed on, the closure element frees the passage between container and metering chamber. This reliably prevents any more product flowing in with the lid part removed. However, as before, the metering device can fill with the product during the drawing off process or during transportation.

It is an object of the present invention to meter different amounts of a liquid without the user coming into contact with the product and without more product flowing in, the intention being that the metering device should remain free of product during transportation prior to the first use.

This object is achieved by means of a metering device for a storage container, the storage container having at its outlet opening an attachment piece on which the metering device is secured. The metering device has a closure piece which can be activated by means of a closure lid and which is in operational engagement with the closure lid in such a manner that when the closure lid is opened, the closure piece closes the outlet opening of the storage container, whereas when the closure lid is shut, the closure piece frees the outlet opening of the storage container. According to the invention, the metering device has, prior to its first use, an integrally connected sealing element in the area of the outlet opening of the storage container, and the closure piece has means for establishing a liquid-perneable connection between the storage container and the metering device.

The metering device according to the invention has the advantage that when the metering device is being filled, the user is protected from the product as a result of the closure lid being shut, the opened closure piece allowing the liquid product to be introduced from the storage container into the metering device. Once the desired amount has been measured off, no further liquid product can flow out of the storage container while the product is being emptied out of the metering device, after opening the closure lid, since the closure piece closes the outlet opening of the storage container.

By using a sealing element which is integrally connected to the metering device, a double closure is created prior to initial use, with the result that the product cannot flow into the metering device during transportation either. When the device is opened for the first time, this sealing element is destroyed and metering is made possible. To this end, the closure piece has means for establishing a liquid-permeable connection between the storage container and the metering device.

The interaction between the closure lid and the closure piece is advantageously achieved by threads running in opposite directions. To this end, the closure lid has a first thread for connection to the metering device and a second thread, running counter to the first one and used for activating the closure piece. A thread running in the opposite direction is in this context to be understood as meaning a thread which is configured such that when the closure lid is screwed on, the closure piece is moved away from the closure lid and toward the outlet opening of the storage container. This can be achieved by the second thread being configured in the same sense as the first thread and with a greater pitch than the first thread.

To avoid accidental loosening of the closure lid, means can be provided for securing it against turning.

The seal between closure piece and metering device is advantageously established by sealing lips. To this end, the closure piece has a sealing lip.

The closure lid can also have sealing means for closing the metering device.

An illustrative embodiment of the invention is represented in the drawing, in which:

FIG. 1 shows a storage container with metering device and cap,

FIG. 2 shows a metering device according to the invention and an associated cap with closure piece in cross section, FIG. 2a shows a plan view of the metering device from FIG. 2 in a special design with return means, FIG. 3 shows the metering device with closure piece and cap arranged on the storage container, in the transportation state prior to its first use, and FIG. 4 shows the metering device after it has been used for the first time.

The bottle shown in FIG. 1 consists mainly of the storage container 1 and the metering device 2. The metering device 2 is provided with a closure in the form of a cap 3 which has a child safety feature. These components are manufactured separately and are assembled in a separate work stage. The shape and the volume of the storage container 1 can be varied, except for the size of the attachment to the metering device 2.

The metering device 2 is made of a thermoplastic which can be treated with fluoride depending on the aggressiveness of the product, and it is additionally transparent to allow amounts to be read off. The need for transparency can be dispensed with in the case of the cap 3.

The storage container 1 consists of a blow-molded hollow body which is likewise made of thermoplastics. After the storage container 1 has been filled with the liquid product, the pre-assembled metering device 2 is connected to said storage container 1.

FIG. 2 shows the metering device 2 and the cap 3, with a closure piece 4 arranged in the cap 3. This closure piece 4 is screwed onto a plug 5 centrally arranged in the cap 3 with an external thread 6, the closure piece 4 having a corresponding internal thread 7. The closure piece is furthermore provided with longitudinal ribs 8 which cooperate with a corresponding groove 9 in the metering device 2 in such a manner that the closure piece 4 is secured against turning while at the same time having axial mobility.

The cap 3 is provided with a thread 10 in the upper area of its inner surface, said thread 10 running in the opposite direction to the thread 6, 7, ie. having a reverse pitch. This thread 10 in the cap 3 finds a corresponding partner in the external thread 11 at the upper end of the metering device 2. Furthermore, projections 12 are provided in the cap 3, in the lower area of the inner wall, said projections 12 cooperating with corresponding projections 13 in the metering device 2 so as to provide a child safety feature.

The metering device 2 has a metering area 14 which extends essentially parallel to the center axis 15 of the metering device 2 and which indicates at least one filling level with a marking 16. The cross-sectional surface area of the metering area 14 perpendicular to the center axis 15 is substantially smaller than the cross-sectional surface area along the center axis 15, the result of which is that liquid product flowing into the metering area immediately produces a visible change in the filling height of the metering area 14.

The metering device 2 also has an attachment piece 17 whose center lies on the center axis 15. This attachment piece 17 is provided all round its inner surface with a collar 18, although the latter can also be interrupted, ie. divided into individual segments.

Arranged inside the attachment piece 17, but at a radial distance from the latter in relation to the center axis 15, there is a guide part 19 which is closed by a sealing element, for example a membrane 20, in the area of its end face. Arranged on the inner wall of the guide part 19 there are guide grooves 9 or other guide means, eg. ribs, cams or knobs, which cooperate with the guide ribs 8 of the closure piece 4.

Finally, the metering device 2 has a surface 2.1 which runs obliquely in relation to the guide part 19 and which serves for the return of excess liquid product. In order to assist this return, a steeper surface 2.1a can also be chosen, and return means 2.2 can be provided on both sides.

The position of the return means 2.2 is evident in FIG. 2a, in which the corresponding projections 13 can also be seen. The return means 2.2 perform the following function: If too much liquid product is inadvertently introduced into the metering area 14, it can be brought into the area of the oblique surface 2.1 by suitably tilting the metering device 2. The return means 2.2, which are designed as plates, then prevent the liquid product from flowing back into the metering area 14. The excess liquid product therefore runs along the oblique surface 2.1 into the storage container 1.

Upon assembly, the closure piece 4 is first screwed into the cap 3. The cap 3 is then pushed onto the upper end of the metering device 2 counter to the resistance afforded by the threads 10, 11. The threads 10, 11 are for this purpose designed with oblique flanks which promote assembly, and loosening after assembly is prevented by steep flanks.

In FIG. 3, the metering device 2 is shown after assembly on the storage container 1.

The guide part 19 is here fitted into a connector 21 formed integrally on the storage container 1. The metering device 2 is then pressed onto the connector 21 until the round collar 18 on the attachment piece 17 is forced past outer projections 22 on the connector 21. By means of the round collar 18 on the metering device 2 and the projections 22 on the connector 21, the metering device 2 is locked together with the storage container 1 in such a manner that they can be separated only if considerable force is applied.

Furthermore, the outer surface of the guide part 19 bears tightly on the inner surface of the connector 21 in the upper area. This sealing surface 23 extends parallel to the longitudinal axis and provides a reliable seal.

The bottle is transported in this state. As a result of the seal between the metering device 2 and the storage container 1 in the area of the sealing surfaces 23, the liquid product cannot escape from the storage container 1. Moreover, since the membrane 20 closes off the metering device 2 tightly from the storage container 1, the liquid product cannot flow into the metering device 2 either.

In FIG. 4, the metering device 2 arranged on the storage container 1 is shown in a state in which the closure piece 4 inside the guide part 19 has been moved downward by turning the cap 3, so that the membrane 20 is now broken off. For this purpose, the closure piece 4 is provided with a point 24 having cutting edges. The longitudinal displacement of the closure part 4 is effected by the cap 3 being unscrewed, with the child safety feature released. By means of the thread of the closure piece running in the opposite direction to the thread of the cap 3, ie. in the same sense and with greater pitch, the point 24 of the closure piece is pressed against the membrane 20. In so doing, the point 24 penetrates the membrane 20 of the metering device 2.

In this position, in which the cap does not necessarily need to be fully unscrewed, the closure piece 4 closes off the passage into the metering device 2 by means of a round outer sealing lip 25. The sealing lip 25 here lies approximately in the area of the sealing surfaces 23 between the connector 21 and the guide part 19. In this position, it is once again ensured that no liquid product can escape from the storage container, even though the membrane 20 has been removed.

To fill the metering device 2 for the first time, it is now necessary to screw the cap 3 back on, by which means, as a result of the screw running in the opposite direction, the closure piece 4 rises and the sealing lip 25 no longer makes sealing contact. When the cap 3 has been screwed on fully and the closure piece 4 is fully opened, the position shown in FIG. 3 is resumed, but this time with the membrane 20 removed. The metering device is filled by tilting it so that the liquid product can flow from the storage container 1 along the closure piece 4 and into the metering area. Excess product can be returned to the storage container 1 from the metering device by tilting it in the opposite direction. The surface 2.1 is of help in doing this.

In order to be able to use the contents of the metering device 2, the cap 3 is unscrewed. By means of the turning movement of the cap 3, the closure piece 4 is pressed into the guide part 19 of the metering device 2. The closure piece 4 can also snap with its round lip into a corresponding throat on the guide part 19 in this process. However, a sealing contact is important here. Because of this sealing contact, it is now impossible for any more liquid product to flow from the storage container 1 into the metering device 2 when the liquid product present in the metering device 2 is being emptied out by a tilting movement.

To support the metering device 2 on the storage container 1, the container 1 is provided with a shoulder 26 which extends from a container wall toward the connector 21 and has a bearing surface 27. The metering device 2 is supported on this bearing surface 27 by means of a support surface 28.

Moreover, in FIG. 4, a sealing lip 29 is provided on the cap 3, said sealing lip 29 cooperating with the metering device 2. This is shown more clearly in FIG. 3. Here, the sealing lip 29 lies tightly on the inner wall of the metering device 2 and prevents product in the metering device from escaping while the metering device is being filled.

The dimensions of the individual components in relation to one another are to be chosen so that on the one hand the necessary tightness can be established, while at the same time guaranteeing their assembly. Moreover, the anchoring of the metering device 2 on the storage container 1 must be of such strength that disengagement of the metering device from the storage container is avoided even under extreme loads.

In summary, the metering device permits an accurate metering of different amounts and the user does not come into contact with the product during said metering. Moreover, the metering device arranged on the storage container cannot fill with the product during the drawing off process or during transportation.

We claim:

1. A metering device for a storage container (1), the storage container (1) having at its outlet opening an attachment piece (21) on which the metering device (2) is secured, the metering device (2) having a closure piece (4) which can be activated by means of a closure lid (3) and which is operational engagement with the closure lid (3) in such a manner that when the closure lid (3) is opened, the closure piece (4) closes the outlet opening of the storage container (1), whereas when the closure lid (3) is shut, the closure piece (4) frees the outlet opening of the storage container (1), wherein the metering device (2) has, prior to its first use, an integrally connected sealing element (20) in the area of the outlet opening of the storage container (1), and the closure piece (4) has means (24) for establishing a liquid-permeable connection between the storage container (1) and the metering device (2), wherein the closure lid (3) has a first thread (10) for connection to the metering device and a second thread (6), running counter to the first one and used for activating the closure piece (4).

2. A metering device as claimed in claim 1, wherein the closure piece (4) has means (8) for securing it against turning.

3. A metering device as claimed in claim 1, wherein the closure piece (4) has a sealing lip (25).

4. A metering device as claimed in claim 1, wherein the closure lid (3) has sealing means (29) for closing the metering device (2).

* * * * *

UNITED STATES PATENT AND TRADEMARK OFFICE
CERTIFICATE OF CORRECTION

PATENT NO. : 6,357,627 B1
DATED : March 19, 2002
INVENTOR(S) : Pasbrig et al.

It is certified that error appears in the above-identified patent and that said Letters Patent is hereby corrected as shown below:

<u>Title page,</u>
Item [75], "Mathias Pasbrig" should be -- Matthias Pasbrig --;
ABSTRACT,
Line 14, "perneable" should be -- permeable --.

<u>Column 6,</u>
Line 8, after "which is" insert -- in --;
Line 9, delete "in such a manner than when the closure lid (3) is opened, the closure piece (4) closes the outlet opening of the storage container (1), whereas when the closure lid (3) is shut, the closure piece (4) frees the outlet opening of the storage container (1),";
Line 22, after "(4)" insert -- such that when the closure lid (3) is opened, the closure piece (4) closes the outlet opening of the storage container (1), whereas when the closure lid (3) is shut, the closure piece (4) frees the outlet opening of the storage container (1). --

Signed and Sealed this

Twenty-fourth Day of September, 2002

*Attest:*

JAMES E. ROGAN
*Attesting Officer*     *Director of the United States Patent and Trademark Office*